(No Model.) 4 Sheets—Sheet 1.
H. F. BROWN.
ORE ROASTING FURNACE.
No. 474,573. Patented May 10, 1892.
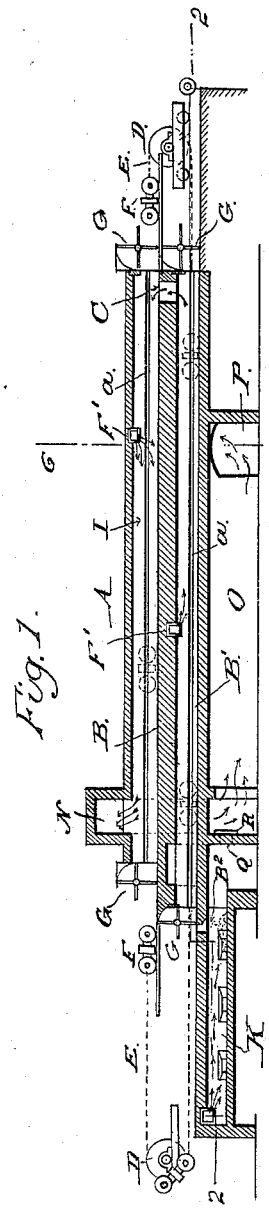
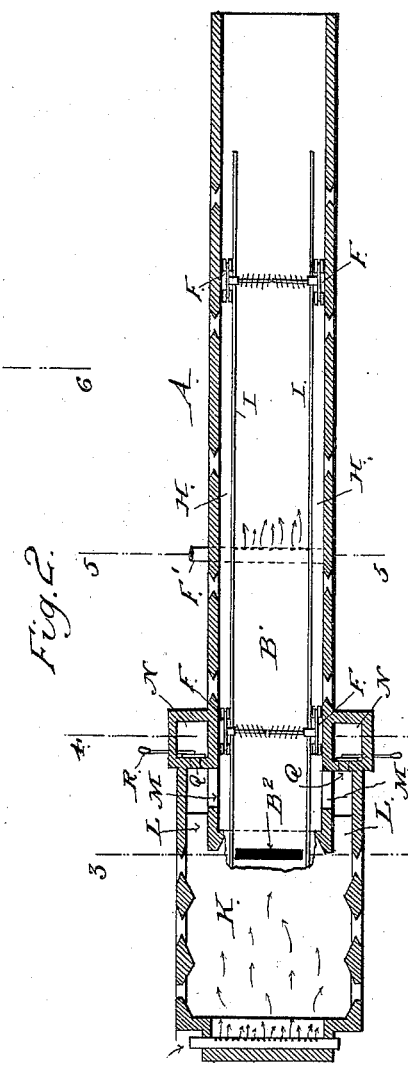
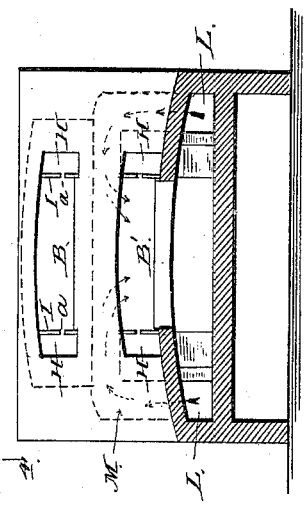
WITNESSES
Chapman Fowler
Thomas Royd Jr
INVENTOR
Horace F. Brown.
by— A. H. Evans & Co
Attorneys
THE NORRIS PETERS CO., PHOTO-LITHO., WASHINGTON, D. C.

(No Model.) 4 Sheets—Sheet 2.

H. F. BROWN.
ORE ROASTING FURNACE.

No. 474,573. Patented May 10, 1892.

WITNESSES
Chapman Fowler
Thomas Royd Jr.

INVENTOR
Horace F. Brown,
by A. H. Evans & Co
Attorneys.

(No Model.) 4 Sheets—Sheet 3.
H. F. BROWN.
ORE ROASTING FURNACE.
No. 474,573. Patented May 10, 1892.
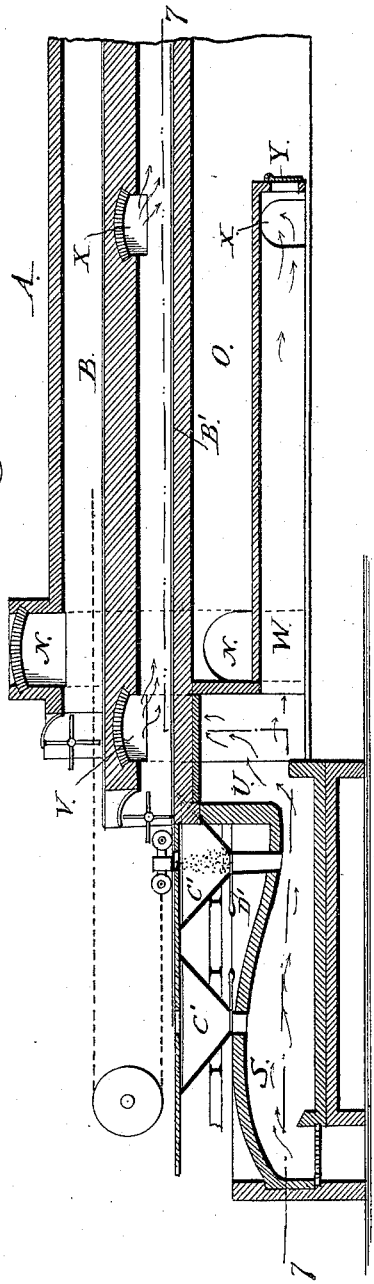
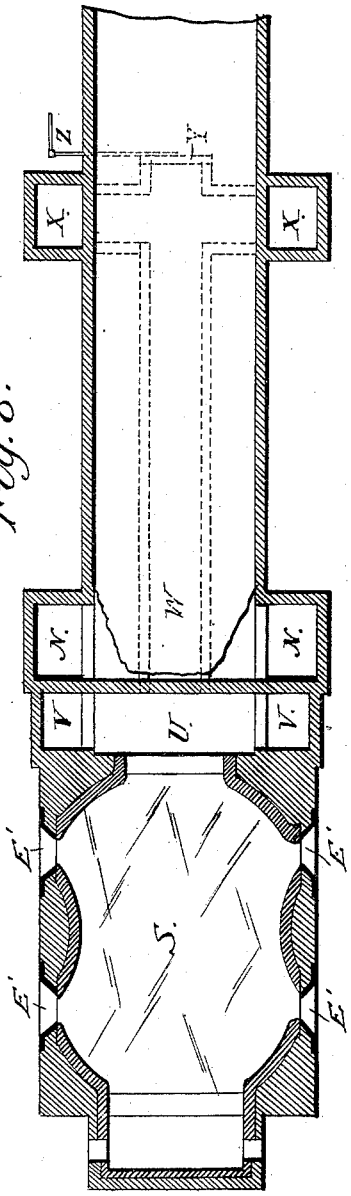
WITNESSES
Chapman Fowler
Thomas Rout Jr.
INVENTOR
Horace F. Brown,
by A. H. Evans & Co.
Attorneys.

(No Model.) 4 Sheets—Sheet 4.
H. F. BROWN.
ORE ROASTING FURNACE.
No. 474,573. Patented May 10, 1892.
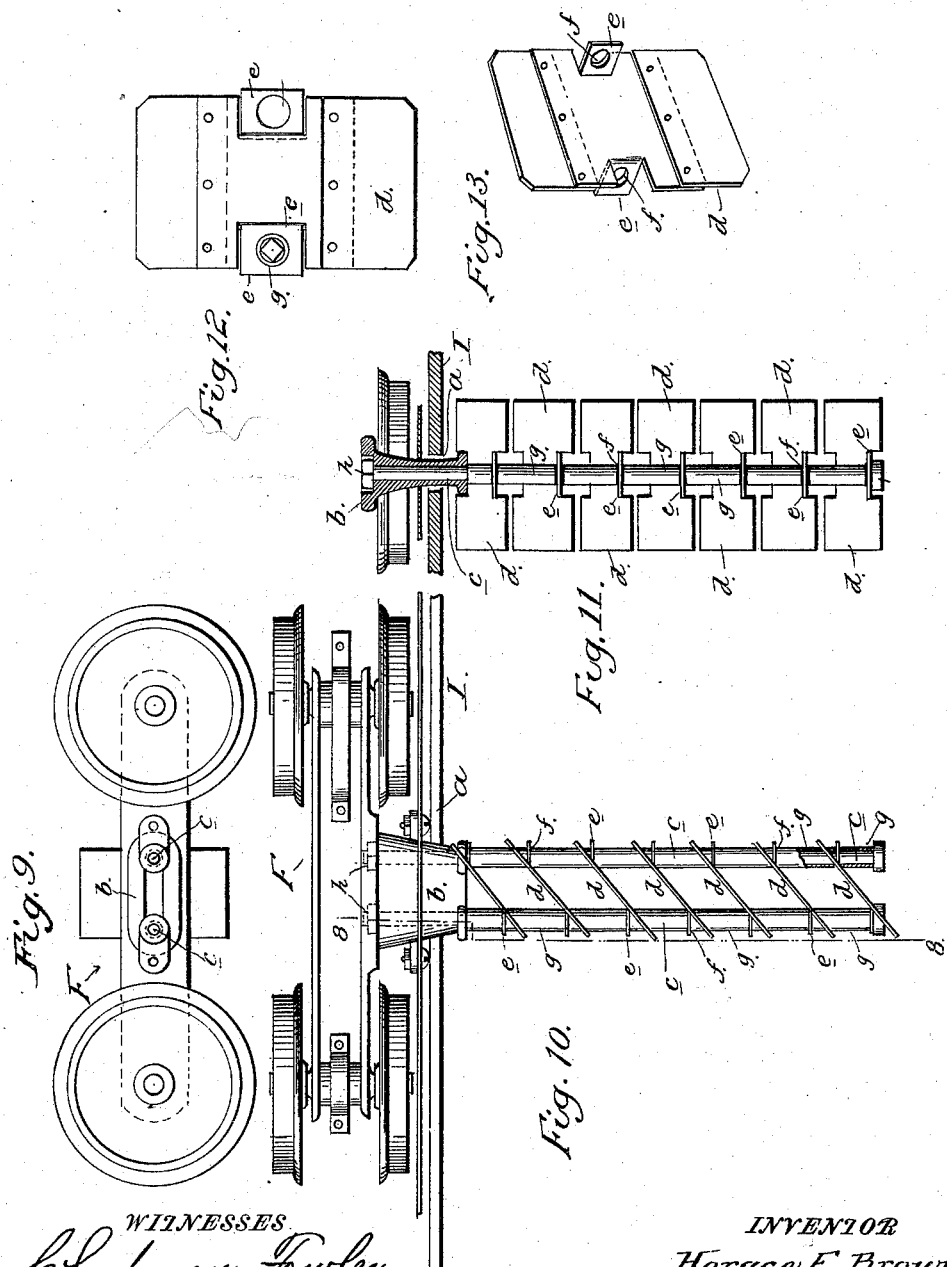
WITNESSES
Chapman Fowler
Thomas Rout Jr
INVENTOR
Horace F. Brown,
by A. H. Evans & Co
Attorneys

UNITED STATES PATENT OFFICE.

HORACE F. BROWN, OF BUTTE CITY, MONTANA, ASSIGNOR TO MARY C. BROWN, OF SAME PLACE.

ORE-ROASTING FURNACE.

SPECIFICATION forming part of Letters Patent No. 474,573, dated May 10, 1892.

Application filed December 8, 1891. Serial No. 414,359. (No model.)

*To all whom it may concern:*

Be it known that I, HORACE F. BROWN, a citizen of the United States, residing at Butte City, in the county of Silver Bow and State of Montana, have invented certain new and useful Improvements in Ore-Roasting Furnaces, as set forth in the accompanying drawings, forming part of this specification, in which—

Figure 4:
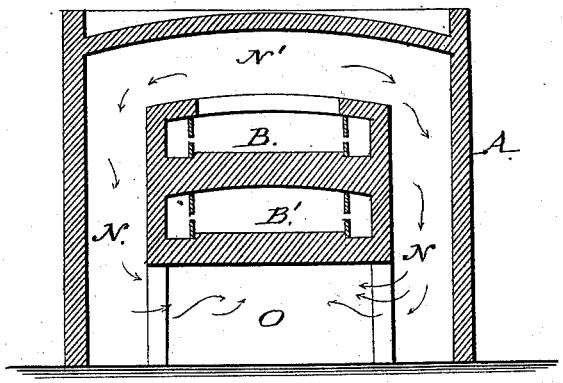
Figure 5:
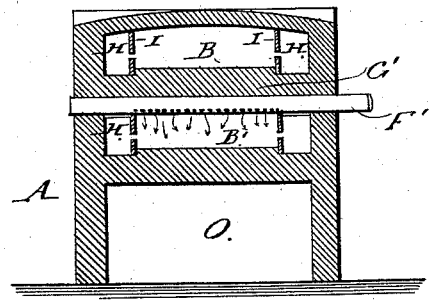
Figure 6:
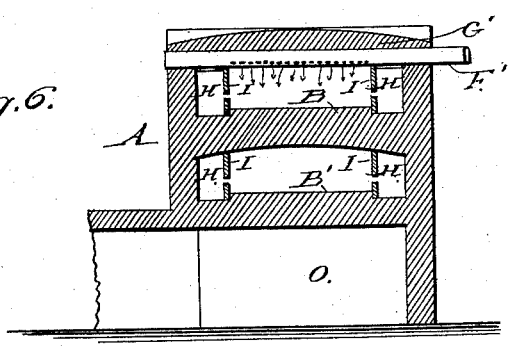

Figure 1 is a longitudinal sectional view of an ore-roasting furnace embodying my invention. Fig. 2 is a horizontal sectional view of the same on the line 2 2 of Fig. 1. Fig. 3 is a transverse sectional view on the line 3 3. Fig. 4 is a similar view on the line 4 4 of Fig. 2. Fig. 5 is a similar view on the line 5 5 of Fig. 2. Fig. 6 is a similar view on the line 6 6 of Fig. 1. Fig. 7 is an enlarged vertical longitudinal section of one end of the furnace, showing a fuse-box and means for delivering the material from the main roasting-hearths to the fuse-box. Fig. 8 is a horizontal sectional view of the same on the line 7 7 of Fig. 7. Fig. 9 is a side elevation of one of the wheeled carriages which carry the stirrer arms and blades. Fig. 10 is a plan view of the same. Fig. 11 is a cross-sectional view on the line 8 8 of Fig. 10. Figs. 12 and 13 illustrate detail views of the stirrer-blades.

My invention relates to certain new and useful improvements on ore-roasting furnaces employing mechanical means for stirring or agitating ores while being roasted, and especially to that class of roasters adapted to the desulphurizing of lead ores and mattes and their after treatment; and my invention consists of the constructions and combinations of devices which I shall hereinafter fully describe and claim.

To enable others skilled in the art to which my invention appertains to make and use the same, I will now describe its construction and indicate the manner in which the same is carried out.

The general operation of the machine of the class named is fully set forth in the Patent No. 207,890, dated September 10, 1878, and granted to David J. O'Harra, and also in the application filed by me August 14, 1891, Serial No. 402,619.

In the art of sintering ores it is a recognized practice to fuse the ores by the application of heat until they begin to become pasty and the fine particles adhere. This condition is produced by spreading a previously-roasted charge over the sintering-hearths and exposing it to a gradually-increasing heat until the surface begins to melt. This charge is then worked toward the point of greatest heat and gradually worked up and agitated and exposed to the action of the heat until it has gathered into balls or spongy cakes, whose particles adhere. This operation is continued until there is no ore left in a fine state of division, when the charge is drawn out and a new charge spread upon the sintering-hearths. The roasted ore or calcine is discharged from the roasting-hearths in a practically continuous manner and in a fine state of subdivision, and is dragged to the hoppers or to an opening which communicates with the sintering-hearth, upon which it accumulates the requisite amount of material necessary to form a new charge while the previous charge is being sintered.

Referring now to the accompanying drawings, A represents an ore-roasting furnace having independent main hearths B B', located one above the other and having a communication or opening C between them, said hearths being designed for the desulphurization of the ore preparatory to fusing or sintering.

At each end of the furnace drums or pulleys D are mounted, and around these drums pass the endless chains E or analogous devices, to which wheeled carriages F are attached and provided with means for stirring and advancing the ore, as I shall hereinafter describe.

Any suitable means may be employed to operate the chains to which the wheeled carriers are attached, and as these chains pass through both the upper and lower hearths of the furnace it is manifest that when the chains are set in motion they go in one way through the upper hearth or compartment and the other way through the lower hearth or compartment. At the ends of the furnace revolving doors G of suitable form are placed to close the entrance to the roasting-compartments, but to turn about their axis when engaged by the traveling carriers, whereby the doors are automatic in their movement.

Along each side of the main compartments or hearths B and B' are formed supplemental or side compartments H, separated from the main compartments by division-walls I, having longitudinal slots a, through which the arms of the stirrers pass. The general construction, arrangement, and operation of the furnace with its main and supplemental compartments, its traveling carriages, and revolving doors are fully disclosed and claimed in my said former application, Serial No. 402,619; but are herein shown to disclose an operative and complete structure.

The essential features of the present case relate to the connection, with a furnace of the kind above mentioned, of a fuse-box or sintering-hearth, and a means for fusing or sintering the ore and working the fuse-boxes, as well as to the introduction of certain flues or passages, gas-inlets, and plows or stirrers for advancing and agitating the ore.

At one end the furnace is extended to form a sintering-hearth K, which lies in a plane somewhat below the plane of the lower main roasting-hearth B', and to allow the accumulation of the roasted ore without danger of the latter becoming prematurely fused this sintering-hearth is constructed with side flues L along the inside of its inner end, which communicate with openings or flues M, leading directly to the main roasting-hearths. By means of these flues the heat is drawn away from the accumulating charge of roasted ores and passes through the side flues L into the main roasting-hearths, where it is utilized for burning sulphur from the ores. Also by the means described the excess of heat required to sinter and fuse ores is delivered to the main roasting-hearths and diffused without danger of its overheating or fusing the ore before the latter has arrived at the proper point. To make this feature clear I would state that should the heat from the sintering-hearth be carried up through the opening B², through which the ore is passed to the sintering-hearth, the accumulating charge would so far fuse as to become an unmanageable mass before it could be moved, and the ore in the main hearths would become fused at the point of discharge.

At the sides of the main roasting-hearths are formed vertical flues N, joined at their upper ends by a transverse flue N', passing over the upper hearth B and receiving the dust and heat therefrom, said flues N having their lower ends connecting with the dust-flue O in the lower part of the furnace, and said dust-flue communicating at its inner end with the flue P, leading to the main stack.

To avoid overheating of the ore and stirring mechanism while the stirrers are at rest or not in action an opening Q is made from each of the side flues L to the vertical flues N and is controlled by a damper R, whereby when these latter are open the heat from the sintering-hearth passes directly to the main stack.

In Figs. 7 and 8 are shown longitudinal and horizontal sections of the furnace, taken through the fuse-box. This fuse-box S is of any suitable construction, having its rear end contracted and connecting with a transverse passage U, leading to side flues V, which in turn lead to the lower roasting-hearth B'. From the transverse passage or flue U a flue W extends centrally along the lower portion of the furnace and connects with another side flue X, also communicating with the roasting-hearth B'. At the inner end of the central flue W is a safety-door Y, operated by a lever Z, whereby when the door is open the entire heat from the fuse-box passes into the dust-flue O and from thence escapes through the stack.

It will thus be seen that in fusing the operation is similar to that carried on in sintering, only a more intense heat is necessary, and in order that all the ore may be brought under the proper degree of heat a somewhat modified construction is necessary. Therefore instead of dividing the heat, as in sintering, the fuse-box is made narrower at its rear end than at its front, and the heat is taken under the main roasting-hearths by the side of flues or passages before mentioned. As the heat in fusing ore is necessarily excessive, it is often advisable and necessary to divide it. Therefore the importance of my central flue W and the system of dampers will be obvious, as a desired proportion of the excessive heat can be carried and delivered to the main roasting-hearths in such a manner as to cause its diffusion without injury to the ore. The roasted ore is discharged by the stirrers from the main roasting-hearths B and B' into suitable hoppers C', whose spouts lead through the top wall of the fuse-box and are provided with gates or valves D', as shown in Fig. 7, whereby the feed of roasted ore to the fuse-box is regulated at pleasure, and when the fusing of the ore has been accomplished the melted ore is drawn from the fuse-box through the side doors E' and a fresh charge is delivered from the hoppers.

In the main roasting-chambers B B' (see Figs. 1, 2, 5, and 6) openings are made to receive metal boxes F', which are located directly under the arches or roofs G' of said chambers and provided with a foraminated floor or bottom extending entirely across the widths of the roasting-hearths. These boxes F' connect with any suitable source of gas-supply; whereby the jets of flame from the foraminated floors of the boxes play on and along the ore, as may be desired. This construction insures a uniform heat clear across the hearths and gives much better results in roasting ores than the means usually employed.

The means employed for stirring and advancing the ore along the main roasting-hearths differ in construction from those set forth in my former application, Serial No. 402,619, before mentioned, and are fully disclosed in Figs. 9 to 13, inclusive. These means consist, essentially, in forming the frame of the wheeled carriages F with metal hubs or sockets $b$, which project through the slotted portion $a$ of the walls I, forming the side compartments H, said hubs or sockets being elongated in form and bored at each end to receive the outwardly-extending arms or rods $c$, separated from each other and arranged parallel, as shown in Fig. 10. Upon these rods the stirrer-blades $d$ are secured, and each blade is formed with oppositely-extending wings $e$, formed by cutting the sides of the blade at two points equidistant from its center and bending the cut portions in opposite lines to form the wings $e$, which lie in parallel planes. In these wings $e$ holes $f$ are made to enable the blades to be slipped over and along the arms or rods $c$, the bent portions or wings $e$ standing at right angles to the rods and the body of the blades being inclined thereto, as shown. Fitted upon the arms or rods $c$ between the blades are sleeves or thimbles $g$, having their ends cut square, and at right angles to their axis adapted to hold the blades apart and also to serve as a protection for the arms or rods $c$. The arms or rods $c$ are therefore provided with alternate stirrers and spreaders, and they are fitted to the hubs or sockets $b$ and secured in position and tightened by means of nuts $h$. The spreaders, being square on their ends, add materially to the strength and rigidity of the arms when tightened together by means of the nuts, and there being two arms or rods for each carriage the blades or stirrers cannot rock on their bearings or become misplaced, and each blade forms an effective brace, uniting each arm or rod with the other, thereby making the stirring devices doubly strong.

I am aware that roasting-furnaces have been constructed with sintering-hearths and fuse-boxes attached; but as far as I know none have been used or adapted for use with a mechanically-stirred furnace where the roasted ore can be collected in charges, which are moved or drawn into the sintering-hearth or fuse-box, as required, and where the heat is taken from the latter and discharged into the main roasting-chambers from the side at one or more points.

I am also aware that stirrers have been used set at an angle on an arm or bar; but I am not aware that two arms have been used and the angular inclination of the blades obtained by bending portions of the blades in opposite directions to form wings through which the arms pass and employing the spreaders square on their ends to secure the parts against movement and make them strong and rigid.

Having thus described my invention, what I claim as new, and desire to secure by Letters Patent, is—

1. In an ore-roasting furnace having upper and lower main hearths with an opening connecting them, a supplemental hearth for the fusing of the roasted ore, and flues or passages leading from the supplemental hearth and entering at different places through the sides of the main hearth, whereby the heat from the supplemental hearth enters the main hearth, substantially as herein described.

2. In an ore-roasting furnace, the upper and lower main hearths with an opening connecting them, in combination with a supplemental hearth upon which the roasted ore from the main hearth is received, means for advancing and agitating the ore in said main hearths, and flues or passages at the sides of the supplemental hearth leading from said hearth and entering through the sides of the main hearths at different places, substantially as herein described.

3. In an ore-roasting furnace, the main hearth, the main flue N, communicating with the interior thereof and connecting with the dust-flue leading to the stack, a supplemental hearth upon which the roasted ore from the main hearth is received, side flues leading from the supplemental hearth through the inner sides of the main hearths, and damper-controlled openings connecting the side flues with the main dust-flues from the roasting-hearth, substantially as herein described.

4. In an ore-roasting furnace having main hearths with dust-flues therefrom to the stack, a supplemental hearth upon which the roasted ore is delivered, flues or passages at the sides of the supplemental hearth and entering at different places through the sides of the main hearths, and damper-controlled openings or flues between the flues from the supplemental hearth and the dust-flues from the main hearths, whereby the heat from the supplemental hearth may be delivered directly to the main stack, substantially as herein described.

5. In an ore-roasting furnace having roasting-hearths, perforated boxes or pipes located at or near the arches or roofs of the hearths, said boxes or pipes connecting with a gas-supply and adapted to throw a series of flame-jets upon the ore at intervals, substantially as herein described.

6. In an ore-roasting furnace, the roasting-hearths, the supplemental hearth upon which the roasted ore is received, dust-flues from the main hearths and connecting with a dust-chamber leading to the stack, side flues connecting with the flue from the supplemental hearth and entering through the sides of the roasting-hearth, a horizontal flue extending centrally along the furnace, communicating at one end with the flue from the supplemental hearth, other side flues connecting with the central flue and leading to the inside of the roasting-hearth, and a safety-door and operating means for closing the end of the horizontal central flue and cutting off communication with the dust-chamber when desired, substantially as herein described.

7. In an ore-roasting furnace having roasting-hearths, the means for stirring and advancing the ore therein, comprising wheeled carriages, hubs or sockets extending therefrom into the body of ore, parallel arms or rods extending from the hub or socket, stirrer-blades having wings bent in opposite directions and provided with holes through which the rods or arms pass, and sleeves or spreaders having square ends mounted on the arms or rods between the bent portions of the blades, substantially as herein described.

8. In an ore-roasting furnace, a stirrer composed of two parallel arms supported at one end upon movable carriages and blades inclined with relation to the arms and having oppositely-bent wings at right angles with the arms and provided with holes, through which the latter pass, substantially as herein described.

9. In an ore-roasting furnace, a stirrer-blade having a portion of each side cut away and bent at right angles in opposite directions, in combination with two parallel supporting-arms separated from each other and adapted to pass through the wings, and a movable support for the arms, substantially as herein described.

10. In an ore roasting furnace, a stirrer consisting of two parallel arms, blades fitted at an angle between said arms and having wings through which the arms pass, and spreaders having square ends on said arms alternating with the blades and adapted to form a rigid support for the same, substantially as herein described.

HORACE F. BROWN.

Witnesses:
WILLIAM DINGLE,
J. STUART STEVENSON.